(12) United States Patent
Berkey et al.

(10) Patent No.: US 11,598,419 B2
(45) Date of Patent: Mar. 7, 2023

(54) SEAL ASSEMBLY WITH ACTUATION MEMBERS CONSTRUCTED OF SHAPE MEMORY MATERIAL

(71) Applicant: The Boeing Company, Chicago, IL (US)

(72) Inventors: Tyler Emerson Berkey, Charleston, SC (US); Nicholas Page, Ladson, SC (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/370,281

(22) Filed: Jul. 8, 2021

(65) Prior Publication Data

US 2022/0018439 A1 Jan. 20, 2022

Related U.S. Application Data

(60) Provisional application No. 63/052,173, filed on Jul. 15, 2020.

(51) Int. Cl.
*F16J 15/16* (2006.01)

(52) U.S. Cl.
CPC .................... *F16J 15/164* (2013.01)

(58) Field of Classification Search
CPC ....... F16J 15/162; F16J 15/164; F16J 15/3284
See application file for complete search history.

(56) References Cited

U.S. PATENT DOCUMENTS

| 5,181,341 | A | * | 1/1993 | Keys | B60J 10/248 |
| | | | | | 404/49 |
| 5,390,974 | A | * | 2/1995 | Theodorakakos | B60R 13/06 |
| | | | | | 49/477.1 |
| 5,489,104 | A | * | 2/1996 | Wolff | B60J 10/77 |
| | | | | | 277/648 |
| 5,899,463 | A | | 5/1999 | Koch | |

(Continued)

FOREIGN PATENT DOCUMENTS

| EP | 0835805 A2 | 5/2001 |
| EP | 1914388 A1 | 4/2008 |

(Continued)

OTHER PUBLICATIONS

European Patent Office. Extended European Search Report for EP Application No. 21185337.9, dated Nov. 30, 2021, pp. 1-10.

(Continued)

*Primary Examiner* — Gilbert Y Lee
(74) *Attorney, Agent, or Firm* — Vivacqua Crane, PLLC

(57) ABSTRACT

A seal assembly configured to seal against a surface of a seal depressor is disclosed. The seal assembly includes a body member configured to elastically expand from an original state into an expanded state. The body member exerts a sealing pressure against the surface of the seal depressor when in the expanded state. The seal assembly also includes one or more actuation members constructed from a shape memory material having a high energy state and a low energy state. The one or more actuation members are con- (Continued)

figured to urge the body member of the seal assembly from the original state into the expanded state when the shape memory material transitions from the low energy state to the high energy state.

20 Claims, 8 Drawing Sheets

(56) References Cited

U.S. PATENT DOCUMENTS

| | | | | |
|---|---|---|---|---|
| 5,940,788 | A * | 8/1999 | Morman | G06F 30/23 |
| | | | | 181/210 |
| 6,394,655 | B1 * | 5/2002 | Schnur | F02F 7/008 |
| | | | | 384/247 |
| 6,683,965 | B1 * | 1/2004 | Sapiejewski | H04R 1/1083 |
| | | | | 381/370 |
| 7,258,347 | B2 | 8/2007 | Keefe et al. | |
| 10,571,025 | B2 | 2/2020 | Takeuchi | |
| 2003/0019160 | A1 * | 1/2003 | Oda | B60J 10/38 |
| | | | | 49/498.1 |
| 2005/0198907 | A1 | 9/2005 | McKnight et al. | |
| 2005/0199440 | A1 | 9/2005 | Keefe et al. | |
| 2006/0125188 | A1 * | 6/2006 | Verbrugge | F16J 15/164 |
| | | | | 277/319 |
| 2008/0296849 | A1 | 12/2008 | Alacqua et al. | |
| 2009/0255187 | A1 | 10/2009 | Alexander et al. | |
| 2012/0286480 | A1 | 11/2012 | Efremov | |
| 2013/0134679 | A1 | 5/2013 | Garlapati | |
| 2014/0248120 | A1 | 9/2014 | Graves | |
| 2015/0322807 | A1 | 11/2015 | Budnick | |
| 2015/0353210 | A1 | 12/2015 | Litwinski | |
| 2017/0191565 | A1 | 7/2017 | Cheng et al. | |
| 2019/0331226 | A1 | 10/2019 | Pritchard | |
| 2019/0338854 | A1 | 11/2019 | Lee et al. | |
| 2021/0207714 | A1 | 7/2021 | Schwendenmann | |

FOREIGN PATENT DOCUMENTS

| | | |
|---|---|---|
| EP | 2116621 A2 | 11/2009 |
| FR | 2738046 B1 | 9/1997 |
| JP | H01146070 U | 10/1989 |
| JP | H0438140 A | 2/1992 |

OTHER PUBLICATIONS

Pereiro-Barcelo et al. "Ductility of high-performance concrete and very-high-performance concrete elements with Ni—Ti reinforcements," Construction and Building Materials, May 3, 2018, pp. 531-551, vol. 175, Elsevier.

* cited by examiner

SEAL ASSEMBLY WITH ACTUATION MEMBERS CONSTRUCTED OF SHAPE MEMORY MATERIAL

CROSS-REFERENCE TO RELATED APPLICATION

This application claims priority to U.S. Provisional Application No. 63/052,173, filed Jul. 15, 2020. The contents of the application are incorporated herein by reference in its entirety.

INTRODUCTION

The present disclosure relates to a seal assembly. More particularly, the present disclosure is directed towards a seal assembly including one or more actuation members constructed of a shape memory material, where the actuation members urge the seal assembly from an original state to an expanded state.

BACKGROUND

Many seals are required to continually compress and decompress, which in turn cycles the seal and may create fatigue issues. Furthermore, because of issues such as unpredictable geometry, kinematics, and tolerance stack-ups, there are many instances where there is little to no engagement between the seal and a corresponding sealing surface during initial installation. For example, kiss seals located on a pre-cooler inlet of a thrust reverser in an aircraft may encounter such issues. Kiss seals are typically installed between two opposing flanges, where the kiss seal is secured to one of the two opposing flanges and the remaining flange presses against the kiss seal. The kiss seal installed on a thrust reverser is cycled each time the thrust reverser is opened and closed. The kiss seal is also exposed to extreme vibrations. Furthermore, it is to be appreciated that the kiss seal not only prevents leakage of pressurized gas, but also acts as an anti-fire barrier.

In another example, a linear seal may be rigged around a periphery of the thrust reverser, which is a time-consuming and laborious process that may take up to several days. Specifically, numerous customized shims are installed between the seal retainer and substructure. The shims are sized to wash out variabilities and adjust the seal assembly so that the seal assembly locally deforms within a predetermined range of compression. Once the shims are installed, the thrust reverser is latched and checked against various requirements. One of these requirements dictate a force required to close the latches. The force may increase drastically in the event the seal assembly is overcompressed. Furthermore, if any of the various requirement are not met, then the entire rigging process for installing the seal assembly is repeated. Thus, it often takes multiple iterations to correctly rig the linear seal around the periphery of a thrust reverser.

SUMMARY

According to several aspects, a seal assembly configured to seal against a surface of a seal depressor is disclosed. The seal assembly includes a body member configured to elastically expand from an original state into an expanded state. The body member exerts a sealing pressure against the surface of the seal depressor when in the expanded state. The seal assembly also includes one or more actuation members constructed from a shape memory material having a high energy state and a low energy state. The one or more actuation members are configured to urge the body member of the seal assembly from the original state into the expanded state when the shape memory material transitions from the low energy state to the high energy state.

In another aspect, a device is disclosed. The device includes a seal depressor defining a sealing surface and a seal assembly including an unsecured surface configured to seal against the sealing surface of the seal depressor. The seal assembly includes a body member configured to elastically expand from an original state into an expanded state. The body member exerts a sealing pressure against the surface of the seal depressor when in the expanded state. The seal assembly also includes one or more actuation members constructed from a shape memory material having a high energy state and a low energy state. The one or more actuation members are configured to urge the body member of the seal assembly from the original state into the expanded state when the shape memory material transitions from the low energy state to the high energy state.

In another aspect, a method is disclosed. The method includes heating one or more actuation members of a seal assembly to an activation temperature of a shape memory material. The one or more actuation members are constructed from the shape memory material, and the seal assembly comprises a body member configured to elastically expand from an original state into an expanded state. In response to heating the seal assembly to the activation temperature, the method includes transitioning, by the actuation members, from a low energy state to a high energy state. The method also includes urging the body member of the seal assembly from an original state to an expanded state as the shape memory material transitions from the low energy state to the high energy state. Finally, the method includes exerting a sealing pressure by the body member of the seal assembly against a sealing surface of a seal depressor once the body member is in the expanded state.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a seal assembly configured to seal against a sealing surface of a seal depressor. The seal assembly includes a body member and one or more actuation members that are constructed from a shape memory material. The shape memory material transitions from a martensitic or low energy state to an austenitic or high energy state at an activation temperature. The actuation members are configured to urge the body member to elastically expand from an original state into an expanded state. As the shape memory material transitions from the low energy state to the high energy state, the actuation members urge the body member of the seal assembly from the original state into the expanded state. Similarly, in one embodiment, the actuation members relax, thereby allowing the body member to revert back to the original state when the shape memory material transitions from the high energy state to the low energy state.

In an embodiment, the activation temperature of the shape memory material is selected so as to correspond to an operating temperature of a device that employs the seal assembly. For example, if the seal assembly is used around a thrust reverser found on the nacelle of an aircraft, then the shape memory material transitions to the high energy state and expands as the aircraft is operating on the ground, during takeoff, or in flight.

The following description is merely exemplary in nature and is not intended to limit the present disclosure, application, or uses.

Figure 1A:
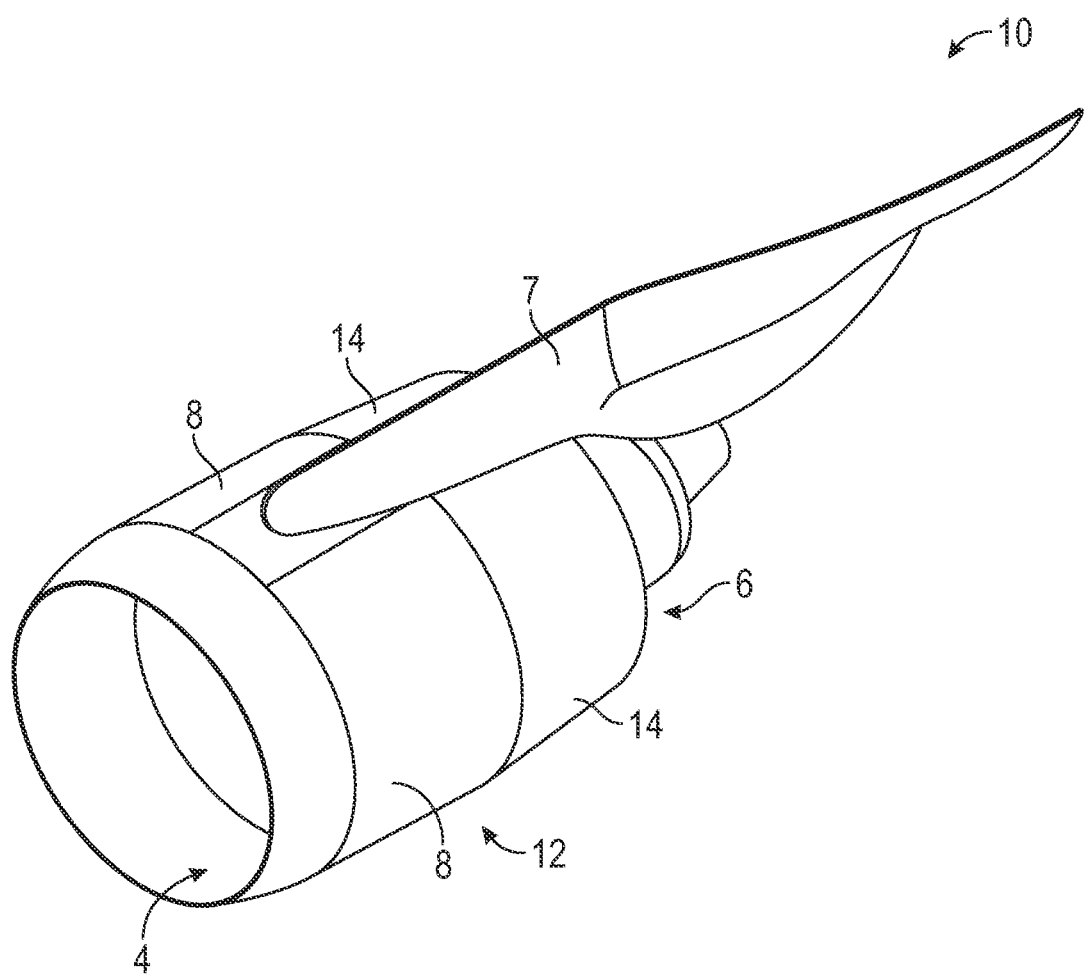
FIG. 1A is a perspective view of a engine nacelle for an aircraft, according to an exemplary embodiment.
Figure 1B:
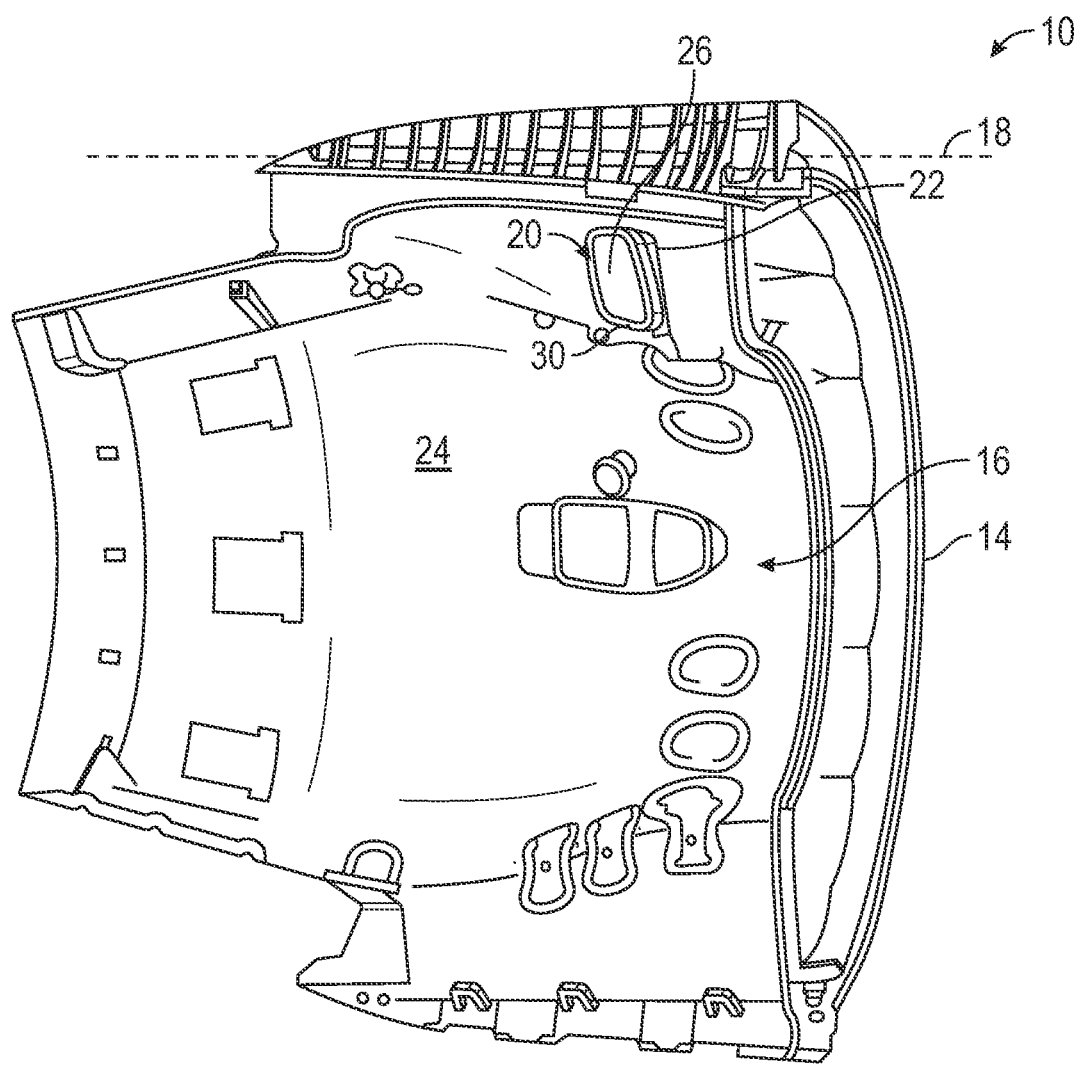
FIG. 1B is an interior view of one of the thrust reversers shown in FIG. 1A including the disclosed seal assembly, according to an exemplary embodiment.

Referring to FIG. 1A, a perspective view of an engine nacelle 10 for an aircraft is illustrated. The engine nacelle 10 includes an inlet 4, an exhaust 6, a pylon 7, two fan cowls 8, and two thrust reversers 14 that are shown in a closed position. FIG. 1B is an illustration of an interior side 16 of one of the thrust reversers 14 shown in FIG. 1A. Referring to both FIGS. 1A and 1B, the thrust reversers 14 are actuated into a closed position shown in FIG. 1A by rotating the thrust reversers 14 towards a bottom portion 12 of the engine nacelle 10 about an upper longitudinal hinge line 18 (seen in FIG. 1B). Referring to FIG. 1B, a seal assembly 20 is disposed around a flange 22 that is located along an interior surface 24 of the thrust reverser 14. The flange 22 forms a duct 26. The seal assembly 20 defines an unsecured surface 30. As the thrust reverser 14 is rotated about the upper longitudinal hinge line 18 towards the bottom portion 12 of the engine nacelle 10 from an opened position into the closed position, the unsecured surface 30 of the seal assembly 20 is configured to seal against a sealing surface 34 (seen in FIGS. 3 and 4) that is part of a seal depressor 36. The seal depressor 36 is part of an engine casing (not visible in the figures) of the engine nacelle 10. The seal assembly 20 is configured to maintain contact with the sealing surface 34 the seal depressor 36, thereby preventing gases from leaking out of the duct 26.

In the non-limiting embodiment as shown in FIGS. 1A and 1B, the seal assembly 20 may be referred to as a kiss type seal, and the duct 26 is an engine pre-cooler duct that transports cool air to a pre-cooler (not shown) of the engine nacelle 10. However, it is to be appreciated that FIGS. 1A and 1B are merely exemplary in nature, and the disclosed seal assembly 20 may be used in a variety of applications other than an engine nacelle. For example, the disclosed seal assembly 20 may be a door seal for an automobile, a train, or a house. Furthermore, although FIGS. 1A and 1B illustrate the seal assembly 20 installed on an thrust reverser 14 that is moveable between an opened position and a closed position, in another embodiment the seal assembly 20 is used as part of a permanent seal installation.

Figure 2:
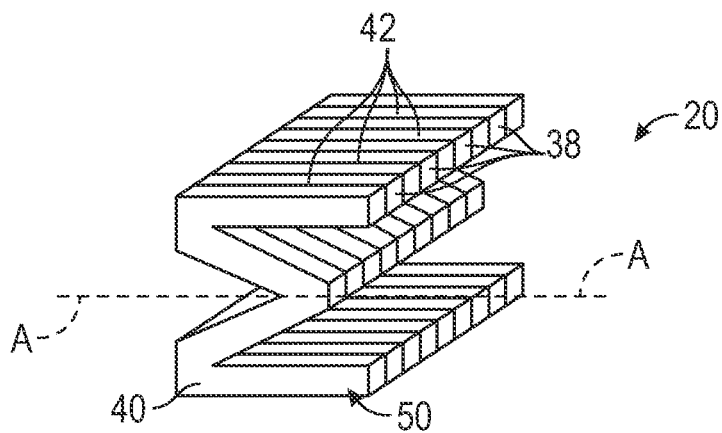
FIG. 2 is a perspective view of one embodiment of the disclosed seal assembly having accordion folds, according to an exemplary embodiment.
Figure 3:
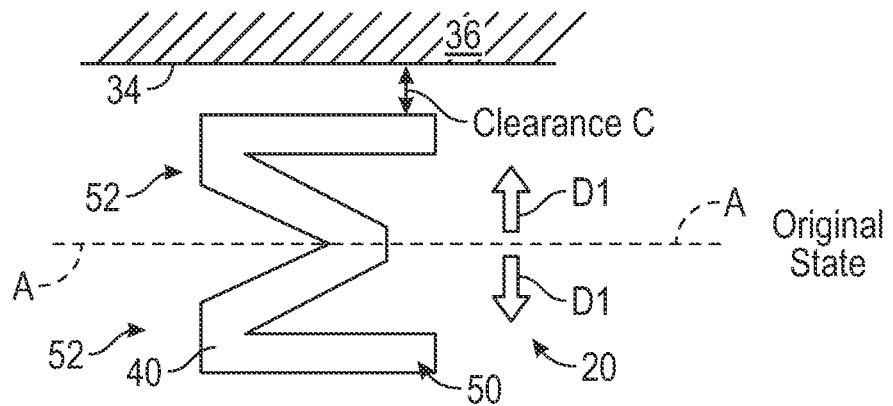
FIG. 3 is a side view the seal assembly shown in FIG. 2 in an original state, according to an exemplary embodiment.
Figure 4:
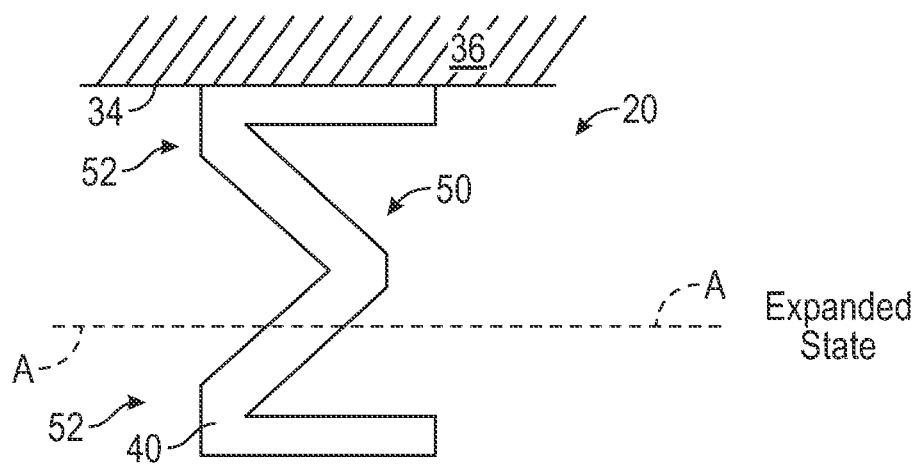
FIG. 4 is a side view of the seal assembly shown in FIG. 2 in an expanded state, according to an exemplary embodiment.

FIG. 2 is a perspective view of the disclosed seal assembly 20 and FIG. 3 is a side view of the seal assembly shown in FIG. 2. In the embodiment as shown in FIGS. 1B, 2, and 3, the seal assembly 20 is in an original state, while FIG. 4 illustrates the seal assembly 20 in an expanded state. As explained below, the seal assembly 20 includes one or more actuation members 38 (seen in FIG. 2) configured to urge a body member 40 of the seal assembly 20 from the original state into the expanded state as shown in FIG. 4.

Referring to FIGS. 2 and 3, the seal assembly 20 includes the body member 40 and one or more actuation members 38 that are constructed of a shape memory material 42. The body member 40 of the seal assembly 20 is constructed of a relatively flexible material such as, but not limited to, an elastomer or a composite material. The shape memory material 42 includes shape memory alloys and shape memory polymers. Some examples of shape memory alloys include, but are not limited to, nickel titanium alloys or nickel copper aluminum alloys. Some examples of shape memory polymers include, but are not limited to, polytetrafluoroethylene (PFTE), polylactide (PLA), and ethylene-vinyl acetate (EVA). The shape memory material 42 includes a low energy state and a high energy state. The low energy state may be referred to as the martensitic state and the high energy state may be referred to as the austenitic state for a shape memory alloy. As explained below, the actuation members 38 are configured to urge the body member 40 of the seal assembly 20 from the original state to the expanded state when the shape memory material 42 transitions from the low energy state to the high energy state.

Referring to FIGS. 2-4, in one embodiment the cross-sectional profile 50 of the body member 40 of the seal assembly 20 includes a plurality of accordion folds 52 that are arranged in a zig-zag or undulating pattern. The accordion folds 52 are oriented in a direction perpendicular to an axis of symmetry A-A of the body member 40 of the seal assembly 20. Referring specifically to FIGS. 2 and 3, the body member 40 of the seal assembly 20 is configured to elastically expand from the original state seen in FIG. 2 into the expanded state seen in FIG. 3, where the body member 40 expands and exerts a sealing pressure against the sealing surface 34 of the seal depressor 36 in the expanded state. The one or more actuation members 38 urge the body member 40 of the seal assembly 20 into the expanded state as the shape memory material 42 transitions from the low energy state to the high energy state. For example, in the embodiment as shown in FIGS. 3 and 4, the accordion folds 52 expand or partially unfold as the body member 40 of the seal assembly 20 expands. Similarly, in one embodiment, the accordion folds 52 constrict or fold back into the original position as the shape memory material 42 transitions from the high energy state back to the low energy state as well.

In an embodiment a clearance C exists between the body member 40 and the sealing surface 34 of the seal depressor 36 when the seal assembly 20 is in the original state. However, in another embodiment, the clearance C may be omitted. The body member 40 expands and fills the clearance C as the body member 40 is urged into the expanded state and exerts the sealing pressure against the sealing surface 34. Specifically, the actuation members 38 urge the accordion folds 52 of the body member 40 to expand in a direction D1 that is perpendicular with respect to the axis of symmetry A-A of the body member 40 of the seal assembly 20 as the shape memory material 42 transitions from the low energy state to the high energy state at an activation temperature. In the exemplary embodiment as shown in the figures, the body member 40 is arranged into two accordion folds 52, however, it is to be appreciated that the seal assembly 20 may incorporate more accordion folds 52 or fewer accordion folds 52 depending upon the specific application.

FIG. 2 illustrates the actuation members 38 oriented perpendicular with respect to the axis of symmetry A-A of the body member 40 of the seal assembly 20. The actuation members 38 are configured to cause the body member 40 of the seal assembly 20 to expand when the shape memory material 42 is in the high energy state. In the non-limiting embodiment as shown in FIG. 2, the seal assembly 20 includes four actuation members 38 that are spaced equidistant to one another. However, it is to be appreciated that the embodiment as shown in FIG. 2 is merely exemplary in nature, and the actuation members 38 may be arranged into any number of configurations.

In the exemplary embodiment as shown in FIGS. 2-4, the actuation members 38 are partially embedded within the body member 40 of the seal assembly 20. However, in the embodiment shown in FIGS. 5A and 6, the actuation members 38 are completely embedded within the body member 40 of the seal assembly. Accordingly, in some embodiments the actuation members 38 are at least partially embedded within the body member 40 of the seal assembly 20. However, in the embodiment as shown in FIG. 7, the actuation members 38 are not embedded within the body member 40 of the seal assembly 20, but instead are disposed along an inner surface 80 of the body member 40 of the seal assembly 20.

When the seal assembly 20 is subjected to elevated temperatures or is heated to the activation temperature of the shape memory material 42 of the actuation members 38, where the shape memory material 42 transitions from the low energy state to the high energy state at the activation temperature. Alternatively, instead of being heated by the surrounding environment, in another embodiment the actuation members 38 are heated to the activation temperature based on Joule heating or by cartridge heaters. In another embodiment, the actuation members 38 are heated by convection, such as a convection fan that blows heated air over the seal assembly 20. For purposes of this disclosure, when the shape memory material is heated, this does not necessarily require subjecting the actuation members 38 to temperatures that are above normal room temperature, which ranges from about twenty to twenty-two degrees Celsius (68-72° F.). Instead, the activation temperature of some types of shape memory materials may be at or below room temperature.

In one embodiment, the shape memory material 42 of the seal assembly 20 is configured to revert back to the original state when the shape memory material 42 transitions from the low energy state to the high energy state. Thus, the actuation members 38 are compliant at temperatures below the activation temperature but become rigid once heated above the activation temperature. Accordingly, the seal assembly 20 expands once heated to the activation temperature. The activation temperature of the shape memory material of the shape memory material 42 is less than an operational temperature of the device that employs sealing assembly 20, where operational temperature represents a range of temperatures that are normally experienced by a device employs the seal assembly 20 as the device is functioning. For example, in the embodiment as shown in FIGS. 1A and 1B, the activation temperature of the shape memory material 42 is less than the operational temperatures that are experienced by the engine nacelle 10.

Figure 5A:
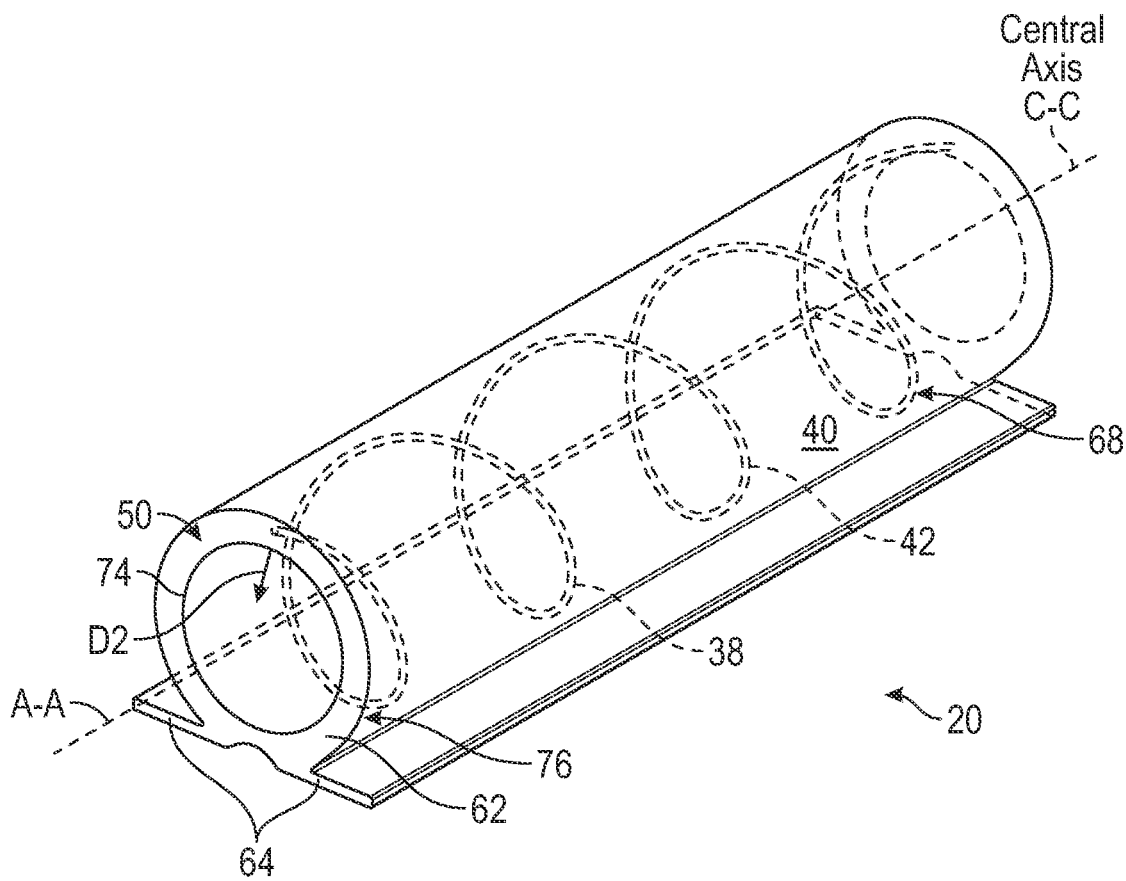
FIG. 5A is an alternative embodiment of the seal assembly in the original state, according to an exemplary embodiment.
Figure 5B:
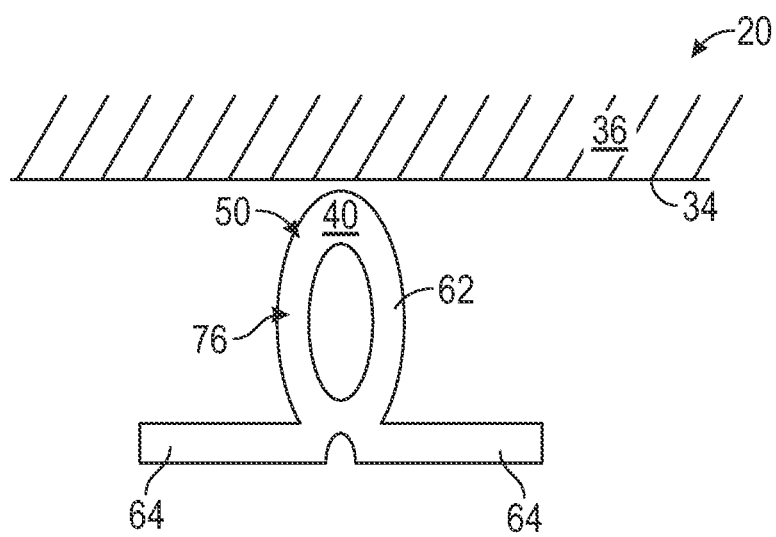
FIG. 5B illustrates the seal assembly shown in FIG. 5A in the expanded state, according to an exemplary embodiment.

FIGS. 5A and 5B illustrate another embodiment of the seal assembly 20, where FIG. 5A is a perspective view of the seal assembly 20 in the original state, and FIG. 5B is a side view of the seal assembly 20 in the expanded state. In the embodiment as shown in FIGS. 5A, the body member 40 of the seal assembly 20 is shaped as an omega seal having a symmetrical body. That is, the body member 40 of the seal assembly 20 includes a cross-sectional profile 50 having a central loop 62 and a pair of terminal legs 64. In the embodiment as shown in FIG. 5A, the one or more actuation members 38 are arranged into a helix 68. The helix 68 incudes a central axis C-C that coincides with the axis of symmetry A-A of the body member 40 of the seal assembly 20. The helix 68 of shape memory material 42 is configured to expand in a direction D2 towards the central axis C-C of the helix 68, and into the expanded state as shown in FIG. 5B.

Referring now to FIG. 5B, when in the expanded state, the central loop 62 of the body member 40 of the seal assembly 20 is flattened, and an eccentricity of the central loop 62 is increased. That is, as seen in FIG. 5A, a portion 76 of the body member 40 of the seal assembly 20 includes a circular cross-sectional profile 74 when the shape memory material 42 of the actuation members 38 is in the low energy state, and is therefore the eccentricity of the portion 76 of the body member 40 is zero. As the actuation members 38 expand into the expanded state as seen in FIG. 5B, the portion 76 of the body member 40 having the circular cross-sectional profile 74 is flattened into an elliptical configuration, and the eccentricity of the circular cross-sectional profile 74 is increased with respect to the sealing surface 34 seal depressor 36. Specifically, the eccentricity of the circular cross-sectional profile 74 of the body member 40 of the seal assembly 20 is increased in a direction that is normal with respect to the sealing surface 34 of the seal depressor 36.

Figure 6:
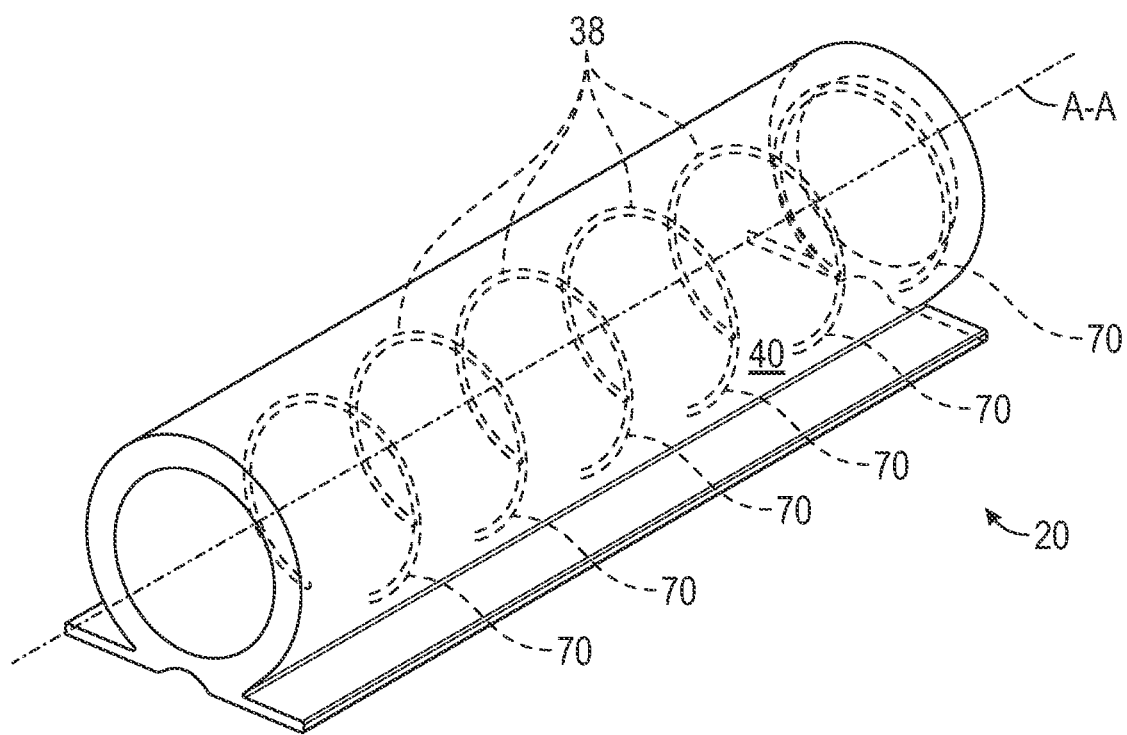
FIG. 6 illustrates another embodiment of the seal assembly, according to an exemplary embodiment.
Figure 7:
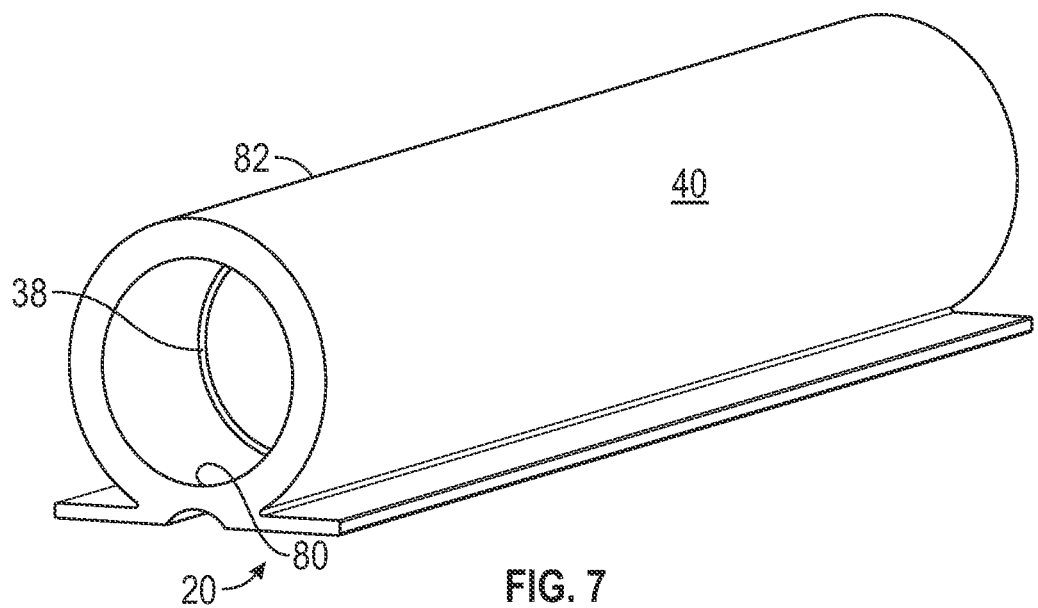
FIG. 7 illustrates an alternative embodiment of the actuation members of the seal assembly, according to an exemplary embodiment.

FIG. 6 is an alternative embodiment of the seal assembly 20 shown in FIG. 5, where the actuation members 38 are arranged as a series of rings 70. The rings 70 are also configured to expand and urge the body member 40 of the seal assembly 20 into the expanded state as seen in FIG. 5B when the shape memory material 42 transitions from the low energy state into the high energy state. It is to be appreciated that the actuation members 38 shown in FIGS. 2, 5A, and 6 are merely exemplary in nature, and the actuation members 38 may be arranged into any number of configurations.

In the embodiment as shown in FIGS. 5A and 6, the actuation members 38 are completely embedded within the body member 40 of the seal assembly 20. However, in the embodiment as shown in FIG. 7, the actuation members 38 are not embedded within the body member 40 of the seal assembly 20, but instead are disposed along an inner surface 80 of the body member 40 of the seal assembly 20. It is to be appreciated that the actuation members 38 are only disposed along surfaces of the seal assembly 20 that do not contact the sealing surface 34 of the seal depressor 36 (FIGS. 3 and 4). For example, in the embodiment as shown in FIG. 7, an outer surface 82 of the body member 40 of the seal assembly 20 contacts the sealing surface 34 of the seal depressor 36. Accordingly, the actuation members 38 are not disposed along the outer surface 82 of the body member 40 of the seal assembly 20.

Figure 8:
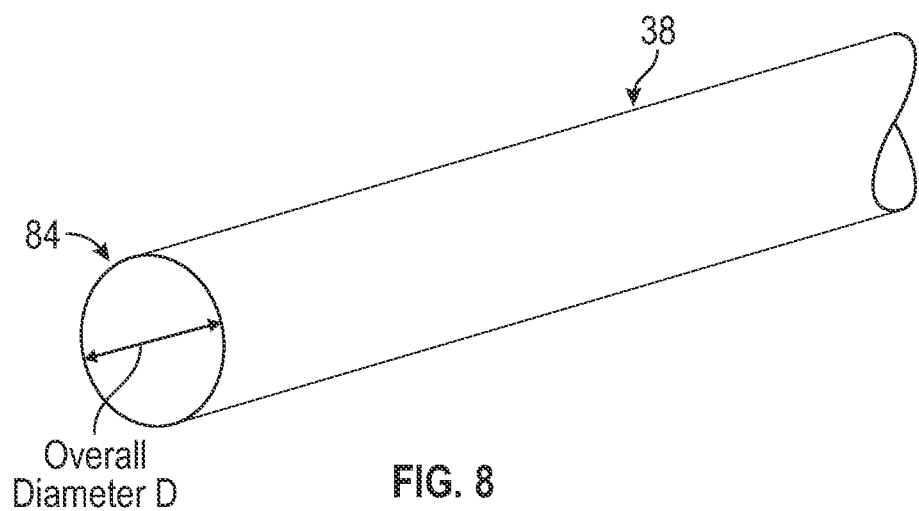
FIG. 8 is an enlarged view of another embodiment of a single actuation member that is part of the seal assembly, according to an exemplary embodiment.

The number, placement, and relative distance between the actuation members 38 are adjusted based on the stiffness of the body member 40 and the amount of expansion required by the seal assembly 20. Referring to FIG. 8, in addition to the number, placement and relative distances of the actuation members, a cross-sectional profile 84 of the actuation members 38 also influence the amount of expansion of the seal assembly 20. For example, in the embodiment as shown in FIG. 8, the actuation member 38 includes a round or circular cross-sectional profile 84, where an overall diameter D of the actuation member 38 may be adjusted based on the specific requirements of the seal assembly 20. However, it is to be appreciated that the actuation members 38 are not limited to a circular cross-sectional profile 84, and may include any numbers of thicknesses, shapes, and profiles.

Figure 9A:
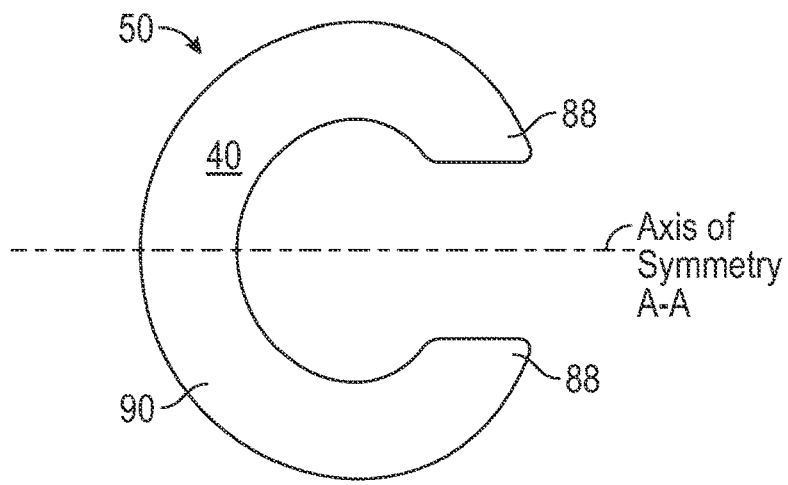
FIGS. 9A, 9B, and 9C illustrate exemplary alternative cross-sectional profiles of the seal assembly shown in FIG. 6, according to an exemplary embodiment.
Figure 9B:
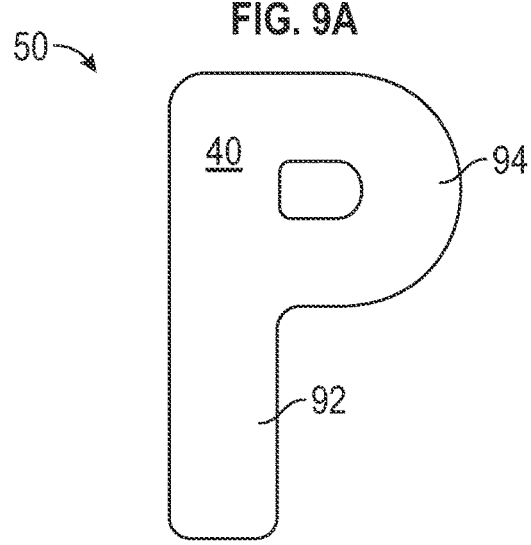
Figure 9C:
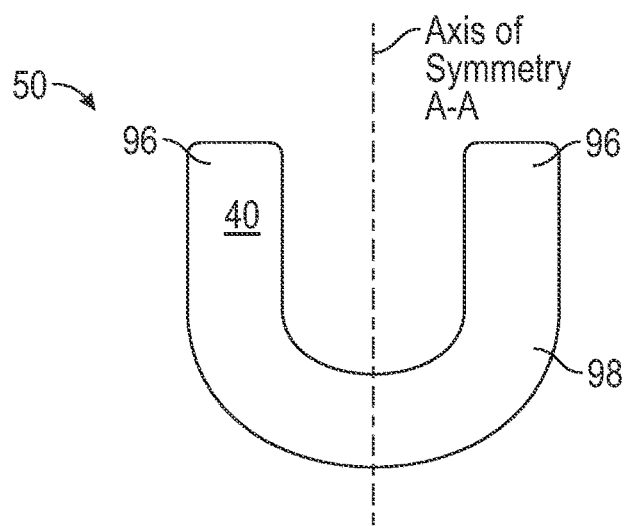

In addition to the actuation members 38, the body member 40 of the seal assembly 20 is not limited to the cross-sectional profiles as shown in FIGS. 2, 3, 4, and 5A. For example, FIGS. 9A, 9B, and 9C illustrate exemplary alternative cross-sectional profiles 50 of the body member 40 of the seal assembly 20. Specifically, FIG. 9A illustrates the body member 40 of the seal assembly 20 having two curved ends 88 connected to one another by an arcuate segment 90 (i.e., a C-shaped cross-sectional profile 50). In the embodiment as shown in FIG. 9B, the body member 40 of the seal assembly 20 includes a linear segment 92 connected to a rounded body end portion 94 (i.e., a P-shaped cross-sectional profile). FIG. 9C illustrates the body member 40 of the seal assembly 20 having two straight ends 96 connected to one another by a curved segment 98 (i.e., a U-shaped cross-sectional profile). Furthermore, although the cross-sectional profiles 50 seen in FIGS. 3-4, 5A, 9A and 9C are symmetrical and include a corresponding axis of symmetry A-A, it is to be appreciated that the seal assembly 20 may include an asymmetrical cross-section profile 50 (i.e., the cross-sectional profile shown in FIG. 9B).

Figure 10:
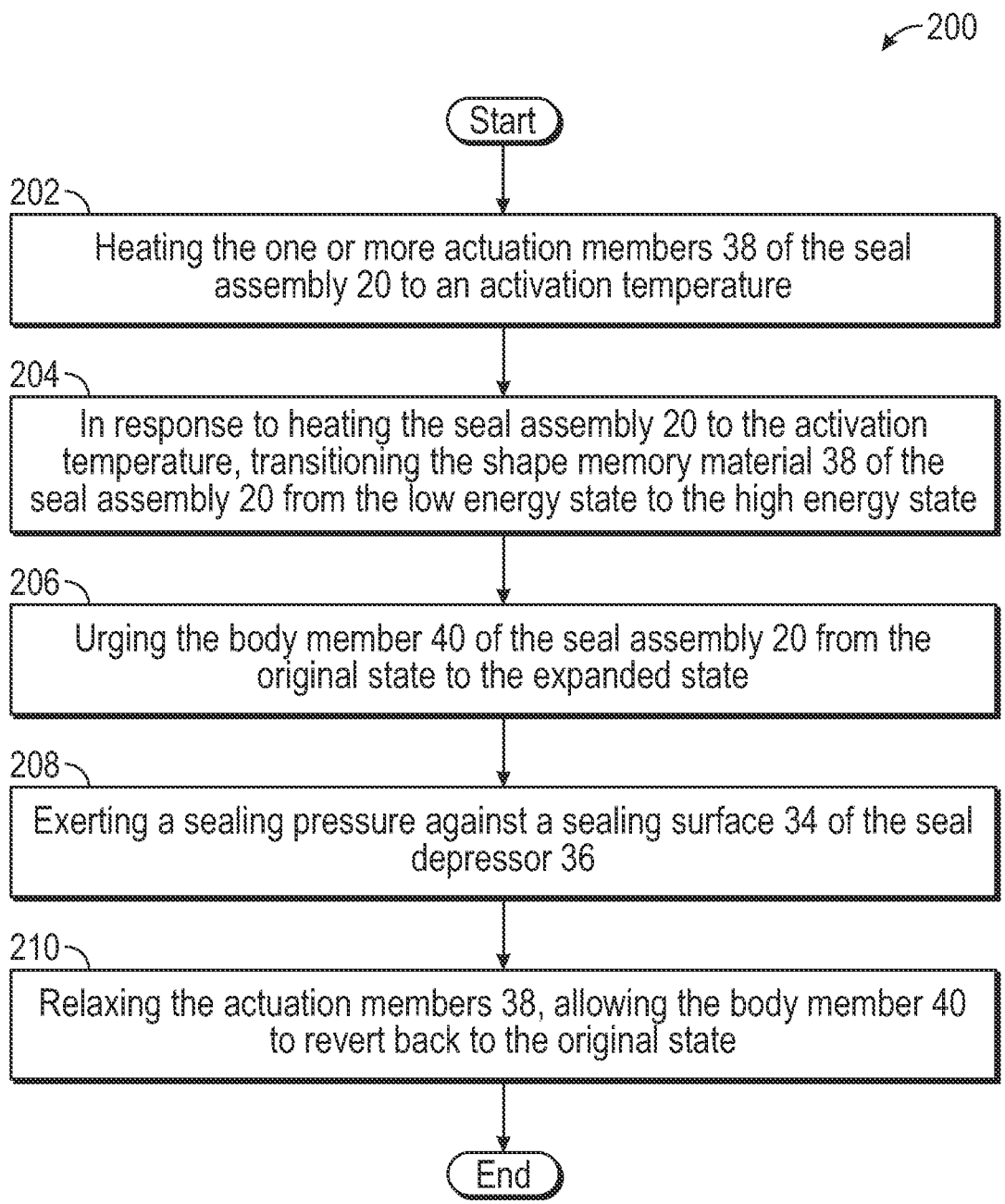
FIG. 10 is a process flow diagram illustrating a method for actuating the seal assembly from an original state into the expanded state, according to an exemplary embodiment.

FIG. 10 is a process flow diagram illustrating a method for actuating the disclosed seal assembly 20 into the expanded position. Referring generally to FIGS. 1A, 1B, 2, 3, and 10, the method 200 begins at block 202. In block 202, the one or more actuation members 38 of the seal assembly 20 are heated to an activation temperature of the shape memory material 42. The one or more actuation members 38 are constructed from the shape memory material 42. As mentioned above, in an embodiment the seal assembly 20 is heated is heated to the activation temperature the surrounding environment, by Joule heating, cartridge heaters, or by convention. The method 200 may then proceed to block 204.

In block 204, in response to heating the seal assembly 20 to the activation temperature, the shape memory material 42 of the actuation members 38 transition from a low energy state to a high energy state. The method 200 may then proceed to block 206.

In block 206, the body member 40 of the seal assembly 20 is urged from the original state to the expanded state as the shape memory material 42 transitions from the low energy state to the high energy state. The method 200 may then proceed to block 208.

In block 208, the body member 40 of the seal assembly 20 exerts a sealing pressure against the sealing surface 34 of the seal depressor 36 (seen in FIGS. 3 and 4) once the body member 40 is in the expanded state. The method 200 may then proceed to block 210.

In block 210, the actuation members 38 relax, and allow the body member 40 to revert back to the original state when the shape memory material 42 transitions from the high energy state back to the low energy state. The method 200 may then terminate or return to block 202.

Referring generally to the figures, the disclosed seal assembly provides various technical effects and benefits. Specifically, the disclosed seal assembly employs actuation members for actively positioning the body member of the seal assembly during operation, which in turn reduces the amount of cycling the seal assembly undergoes when compared to conventional approaches Moreover, the shape memory material of the actuation members allows the body member of the seal assembly to revert back to its original position based on the temperature of the surrounding environment. Accordingly, when a device that the seal assembly is installed upon is not operating, the body of the seal assembly reverts back to its original position. For example, if the seal assembly is employed in a thrust reverser, an air gap or clearance exists between the seal and the engine pre-cooler when the thrust reverser is not operating. As a result, the seal assembly is not cycled when the thrust reverser is opened and closed during maintenance checks when the aircraft is on the ground, which in turn reduces the amount of compression set that may occur when a seal has been compressed for an extended period of time. However, during operation, the seal assembly expands to fill the air gap or clearance between the seal assembly and the engine pre-cooler.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seal assembly configured to seal against a sealing surface of a seal depressor, the seal assembly comprising:
   a body member configured to elastically expand from an original state into an expanded state, wherein the body member exerts a sealing pressure against the sealing surface of the seal depressor when in the expanded state; and
   one or more actuation members constructed from a shape memory material having a high energy state and a low energy state, the one or more actuation members configured to urge the body member of the seal assembly from the original state into the expanded state when the shape memory material transitions from the low energy state to the high energy state, wherein the one or more actuation members are at least partially embedded within the body member of the seal assembly.

2. The seal assembly of claim 1, wherein the actuation members relax, and allow the body member to revert back to the original state when the shape memory material transitions from the high energy state back to the low energy state.

3. The seal assembly of claim 1, wherein a cross-sectional profile of the body member of the seal assembly includes a plurality of accordion folds arranged in an undulating pattern.

4. The seal assembly of claim 3, wherein the accordion folds are oriented in a direction perpendicular to an axis of symmetry of the body member of the seal assembly.

5. The seal assembly of claim 4, wherein the actuation members urge the accordion folds of the body member to expand in a direction perpendicular with respect to the axis of symmetry of the body member of the seal assembly as the shape memory material transitions from the low energy state to the high energy state.

6. The seal assembly of claim 1, wherein a clearance exists between the body member and the seal depressor when the seal assembly is in the original state, and wherein the body member fills the clearance as the body member expands into the expanded state.

7. The seal assembly of claim 1, wherein the one or more actuation members are a series of rings.

8. The seal assembly of claim 1, wherein the one or more actuation members are arranged into a helix having a central axis.

9. The seal assembly of claim 8, wherein the central axis of the helix coincides with an axis of symmetry of the body member of the seal assembly.

10. The seal assembly of claim 1, wherein a portion of the body member of the seal assembly includes a circular cross-sectional profile when the shape memory material of the actuation members is in the low energy state.

11. The seal assembly of claim 10, wherein the portion of the body member having the circular cross-sectional profile is flattened into an elliptical configuration and an eccentricity of the circular cross-sectional profile is increased when the actuation members expand into the high energy state.

12. The seal assembly of claim 1, wherein the shape memory material transitions from the low energy state to the high energy state at an activation temperature.

13. The seal assembly of claim 1, wherein the shape memory material is at least one of a shape memory alloy and a shape memory polymer.

14. The seal assembly of claim 1, wherein the one or more actuation members are completely embedded within the body member of the seal assembly.

15. A device, comprising:
a seal depressor defining a sealing surface; and
a seal assembly including an unsecured surface configured to seal against the sealing surface of the seal depressor, the seal assembly comprising:
  a body member configured to elastically expand from an original state into an expanded state, wherein the body member exerts a sealing pressure against the sealing surface of the seal depressor when in the expanded state; and
  one or more actuation members constructed from a shape memory material having a high energy state and a low energy state, the one or more actuation members configured to urge the body member of the seal assembly from the original state into the expanded state when the shape memory material transitions from the low energy state to the high energy state, wherein the one or more actuation members are at least partially embedded within the body member of the seal assembly.

16. The device of claim 15, wherein the actuation members relax, and allow the body member to revert back to the original state when the shape memory material transitions from the high energy state back to the low energy state.

17. The device of claim 15, wherein an activation temperature of the shape memory material is less than an operational temperature of the device.

18. A method, comprising:
heating one or more actuation members of a seal assembly to an activation temperature of a shape memory material, wherein the one or more actuation members are constructed from the shape memory material, and wherein the seal assembly comprises a body member configured to elastically expand from an original state into an expanded state;
in response to heating the seal assembly to the activation temperature, transitioning, by the actuation members, from a low energy state to a high energy state, wherein the one or more actuation members are at least partially embedded within the body member of the seal assembly;
urging the body member of the seal assembly from an original state to an expanded state as the shape memory material transitions from the low energy state to the high energy state; and
exerting a sealing pressure by the body member of the seal assembly against a sealing surface of a seal depressor once the body member is in the expanded state.

19. The method of claim 18, further comprising:
relaxing the actuation members, the body member back to the original state when the shape memory material transitions from the high energy state back to the low energy state.

20. The method of claim 18, wherein the seal assembly is heated to the activation temperature by one of the following: a surrounding environment, Joule heating, and by convention.

* * * * *